US011893147B2

United States Patent
Kunzler

(10) Patent No.: US 11,893,147 B2
(45) Date of Patent: Feb. 6, 2024

(54) OCCUPANT SUPPORT DEVICE AND SYSTEM FOR CONTROLLING OBJECTS

(71) Applicant: LIMBIC LIFE AG, Zurich (CH)

(72) Inventor: Patrik Kunzler, Zurich (CH)

(73) Assignee: LIMBIC LIFE AG, Zurich (CH)

( * ) Notice: Subject to any disclaimer, the term of this patent is extended or adjusted under 35 U.S.C. 154(b) by 0 days.

(21) Appl. No.: 16/083,671

(22) PCT Filed: Mar. 6, 2017

(86) PCT No.: PCT/EP2017/055183
§ 371 (c)(1),
(2) Date: Sep. 10, 2018

(87) PCT Pub. No.: WO2017/153332
PCT Pub. Date: Sep. 14, 2017

(65) Prior Publication Data
US 2019/0086998 A1    Mar. 21, 2019

(30) Foreign Application Priority Data

Mar. 11, 2016  (EP) .................................. 16159784
Sep. 15, 2016  (EP) .................................. 16189006

(51) Int. Cl.
*G06F 3/01*    (2006.01)
*G06F 21/32*   (2013.01)
(Continued)

(52) U.S. Cl.
CPC ............ *G06F 3/011* (2013.01); *A63F 13/212* (2014.09); *A63F 13/428* (2014.09); *G06F 3/012* (2013.01);
(Continued)

(58) Field of Classification Search
None
See application file for complete search history.

(56) References Cited

U.S. PATENT DOCUMENTS 5,754,791 A    5/1998 Dahlgren
5,863,094 A *  1/1999 Endo ................. B62J 1/005
                                       297/195.1

(Continued)

FOREIGN PATENT DOCUMENTS

CN    102693495 A    9/2012
CN    104657826 A    5/2015
(Continued)

OTHER PUBLICATIONS

European Examination Report dated Jun. 19, 2019, for EP 17 708 533.9.
(Continued)

*Primary Examiner* — Patrick N Edouard
*Assistant Examiner* — Peijie Shen
(74) *Attorney, Agent, or Firm* — Bryan D. Zerhusen; Nicholas R. Herrel; CANTOR COLBURN LLP

(57) ABSTRACT

An occupant support system is disclosed for controlling a computer-generated representation of an object, comprising: (i) a support device comprising a plurality of support members configured to support an occupant, and a corresponding plurality of independently movably supported suspension systems such to provide at least one independent motion selected from vertical, lateral, tilt and azimuthal motions and longitudinal roll motion of the support members. The support system further comprises (ii) a plurality of sensors which are operatively coupled with the support members and configured to measure a parameter which is indicative of an input provided by the occupant, while occupying the device, in a hands-free manner and to produce a signal, wherein the input changes a state of the support device; (iii) a memory module comprising computer-executable instructions; and (iv) a processor operative to receive the produced signal and determine a state of the occupant support device (Continued)

based on the produced signal and the computer-executable instructions, and to provide instructions for controlling the computer-generated object representation.

14 Claims, 3 Drawing Sheets

(51) Int. Cl.
*G06F 21/62* (2013.01)
*G06F 3/033* (2013.01)
*A63F 13/212* (2014.01)
*A63F 13/428* (2014.01)

(52) U.S. Cl.
CPC .............. *G06F 3/013* (2013.01); *G06F 3/033* (2013.01); *G06F 21/32* (2013.01); *G06F 21/6218* (2013.01); *G05B 2219/40175* (2013.01); *G06F 2221/2149* (2013.01)

(56) References Cited

U.S. PATENT DOCUMENTS

| | | | | |
|---|---|---|---|---|
| 6,056,356 | A * | 5/2000 | Unger, Jr. | B62J 1/04 297/215.15 |
| 6,353,773 | B1 * | 3/2002 | Takenaka | B25J 13/04 340/5.1 |
| 8,447,273 | B1 * | 5/2013 | Friedlander | H04M 1/72463 382/116 |
| 8,843,754 | B2 * | 9/2014 | Alward | G06F 21/316 713/182 |
| 9,293,042 | B1 | 3/2016 | Wasserman | |
| 9,300,925 | B1 | 3/2016 | Zhang | |
| 9,355,236 | B1 | 5/2016 | Kratz et al. | |
| 9,495,057 | B1 * | 11/2016 | Bajpai | G06F 21/604 |
| 9,519,763 | B1 * | 12/2016 | Rodriguez | G06F 3/0346 |
| 9,925,101 | B2 | 3/2018 | Kuenzler et al. | |
| 9,977,887 | B2 * | 5/2018 | Bengtsson | G06F 3/0227 |
| 10,303,863 | B2 * | 5/2019 | Chatterton | G06F 21/316 |
| 10,445,481 | B1 * | 10/2019 | Sokolov | G06F 21/32 |
| 10,482,551 | B2 * | 11/2019 | Zomet | G06Q 50/12 |
| 10,646,153 | B1 * | 5/2020 | Berme | A61B 5/1036 |
| 2001/0042968 | A1 * | 11/2001 | Andrews | B62K 3/005 280/220 |
| 2002/0145321 | A1 * | 10/2002 | Brightbill | A61G 5/1043 297/312 |
| 2003/0028784 | A1 * | 2/2003 | Uchida | G06V 40/30 713/186 |
| 2004/0071164 | A1 | 4/2004 | Baum | |
| 2004/0239161 | A1 * | 12/2004 | Lee | A47C 7/72 297/217.3 |
| 2005/0288157 | A1 * | 12/2005 | Santos-Munne | A61H 1/0292 482/68 |
| 2009/0079243 | A1 * | 3/2009 | Kunzler | B64D 11/0649 482/142 |
| 2009/0083537 | A1 | 3/2009 | Larsen | |
| 2009/0135133 | A1 * | 5/2009 | Kunzler | A63F 13/245 345/156 |
| 2009/0286550 | A1 | 11/2009 | Weinroth | |
| 2010/0295656 | A1 | 11/2010 | Heirckhoff | |
| 2011/0238079 | A1 * | 9/2011 | Hannaford | A61B 34/76 606/130 |
| 2011/0254681 | A1 | 10/2011 | Perkinson | |
| 2011/0285579 | A1 * | 11/2011 | Bangera | A61B 5/7253 342/189 |
| 2012/0096490 | A1 | 4/2012 | Barnes, Jr. et al. | |
| 2013/0028489 | A1 * | 1/2013 | Tracton | G06V 40/20 382/128 |
| 2013/0113252 | A1 | 5/2013 | Kunzler | |
| 2014/0085050 | A1 * | 3/2014 | Luna | H04W 12/33 340/5.82 |
| 2014/0240092 | A1 * | 8/2014 | Nielsen | G06Q 30/0242 340/5.81 |
| 2015/0061825 | A1 | 3/2015 | Suzuki | |
| 2015/0227180 | A1 * | 8/2015 | Rabii | G06F 3/017 713/323 |
| 2015/0242899 | A1 | 8/2015 | Farhi | |
| 2015/0317833 | A1 | 11/2015 | Ebstyne | |
| 2015/0324560 | A1 | 11/2015 | Smith | |
| 2016/0088948 | A1 * | 3/2016 | Boduk | A47C 31/126 297/217.2 |
| 2016/0091989 | A1 * | 3/2016 | Pandya | G06F 3/03543 345/163 |
| 2016/0134484 | A1 | 5/2016 | Tanaka | |
| 2016/0171806 | A1 * | 6/2016 | Van Dyken | G06V 40/20 367/199 |
| 2017/0083693 | A1 * | 3/2017 | Bengtsson | G06F 21/32 |
| 2017/0116402 | A1 | 4/2017 | Hirabayashi et al. | |
| 2017/0123757 | A1 * | 5/2017 | Lancaster | G06F 3/167 |
| 2017/0178469 | A1 * | 6/2017 | Nahman | G08B 6/00 |
| 2017/0240066 | A1 * | 8/2017 | Wang | B60N 2/002 |
| 2017/0242966 | A1 * | 8/2017 | de Leon | G16H 40/63 |
| 2018/0068108 | A1 * | 3/2018 | Fish | G06F 21/316 |
| 2018/0232507 | A1 * | 8/2018 | Zizi | A61B 3/113 |
| 2018/0251031 | A1 * | 9/2018 | Liebau | G06V 20/597 |
| 2019/0029606 | A1 * | 1/2019 | Sheth | A61B 5/7275 |
| 2019/0291741 | A1 * | 9/2019 | Lelievre | G05B 19/402 |

FOREIGN PATENT DOCUMENTS

| | | |
|---|---|---|
| CN | 105190674 A | 12/2015 |
| JP | 2000-508136 | 6/2000 |
| JP | 2006345033 A | 12/2006 |
| JP | 2009-134688 | 6/2009 |
| JP | 2009-175909 | 8/2009 |
| JP | 2011-070642 | 4/2011 |
| JP | 2012-178022 | 9/2012 |
| JP | 2015-111931 | 6/2015 |
| KR | 2010-0030282 | 3/2010 |
| KR | 2020-0030282 A | 3/2020 |
| WO | WO 2012/067213 | 5/2012 |
| WO | WO 2014/162331 | 10/2014 |

OTHER PUBLICATIONS

International Search Report and Written Opinion from PCT/EP2017/055183, dated May 11, 2017.
Chinese Office Action for App No. 201780013008.3 dated Jul. 26, 2021.
Communication Pursuant to Article 94(3) EPC, dated Dec. 10, 2020, for Patent Application No. 17713675.1.
International Search Report and Written Opinion from PCT/EP2017/057243, dated Jul. 5, 2017.
Japanese Office Action dated Aug. 20, 2019, for JP-2018-563943 (with Translation).
Korean Notice of Preliminary Rejection for Application No. 10-2020-7033195, dated Jan. 13, 2021.
Korean Office Action for App No. 10-2020-7014460 dated Jul. 26, 2021.
Korean Office Action for Application No. 10-2018-7025440, dated Nov. 21, 2019.
Korean Office Action for Application No. 10-2020-7014460, dated Sep. 16, 2020 (with English translation).
Written Opinion of the International Preliminary Examining Authority for PCT/EP2017/057243, dated May 14, 2018.
Japanese Office Action for Japanese Patent Application No. 2020-122974 dated Oct. 25, 2021 Translation.
Korean Office Action for Application No. 10-2020-7033195, dated Nov. 25, 2021 (with English translation).

* cited by examiner

OCCUPANT SUPPORT DEVICE AND SYSTEM FOR CONTROLLING OBJECTS

RELATED APPLICATION

This application is a National Stage of PCT/EP2017/055183, filed 6 Mar. 2017, titled: OCCUPANT SUPPORT DEVICE AND SYSTEM FOR CONTROLLING OBJECTS, which claims the benefit and priority to European Patent Application No. 16159784.4, filed on 11 Mar. 2016, and European Patent Application No. 16189006.6, filed on 15 Sep. 2016, both of which are incorporated herein by reference in their entirety for all purposes.

TECHNICAL FIELD AND BACKGROUND

The present disclosure relates to devices, systems and method for controlling objects.

Devices and systems commonly used for interaction with computers and other electronic devices are configured to be responsive to the movements of a user's extremities which include, e.g. the user's arms, hands, fingers, legs and/or head. Such devices include an electronic mouse, a trackball, remote controllers, touchscreens, foot pedals and helmet-mounted systems and can be used to control a location and/or movement of computer-generated representations of objects displayed on an associated screen and/or for controlling tangible objects (e.g., apparatuses and/or machines).

Such devices become more prevalent in our everyday life and may, at the same time, require increased user-skill and dexterity. In addition, the continuous use of pointing devices may be harmful to human health and cause physical discomfort and stress.

DESCRIPTION OF THE INVENTION

Aspects of disclosed embodiments of the invention relate to an occupant support device and system for controlling objects, inter alia, responsive to a movement of the pelvis and/or the thighs in a coronal (also: frontal), transverse and/or sagittal plane e.g., without requiring the actuation of hand-controlled devices and systems. Accordingly, in some embodiments, an occupant support device and system may be configured and operative to allow its occupant, while seated, to control objects in a hands-free manner. Such objects may be real-time responsive to instructions provided by a processor or controller.

The occupant support device may in some embodiments be configured and operative to have the capability to facilitate or allow its occupant, while seated, to move in or rotate, e.g., their pelvis and/or thighs along a coronal (also: frontal), transverse, and/or sagittal planes or direction. Accordingly, the occupant support device may be configured and operative to allow or facilitate the occupant, while seated, to rock its pelvis in the coronal plane as in a natural motion that may occur during walking and/or other physical activity. For example, the occupant support device may facilitate the occupant, while seated, to move its pelvis in an alternating up/down and/or back/forth movement. The occupant support device and system therefore may not constraint its occupant's position to a fixed horizontal position.

Furthermore, in some embodiments, the occupant support device may be configured and operative to facilitate or even require its occupant, while seated, to perform balancing micro-movements that occur when standing, walking and/or when sitting in a non-steady environment such as a boat or vehicle, and which are notably absent when sitting in current chairs. For instance, the angle between the seatback and the sitting surface may be alterable at high frequencies allowing spontaneous or controlled back- and leg movements.

Within this description, a person who may occupy the occupant support device will be referred to as "occupant". While the occupant is not shown in the figures, certain features of the device may be described in terms of an implied occupant. An "occupant" may additionally or alternatively refer to a robot.

The term "object" as used herein may, for example, comprise an apparatus; a mechanism; a system; a plurality of interconnected apparatuses, mechanisms or systems; a virtual and/or augmented reality environment; a computer-generated element (e.g., shape) displayed, e.g., on a computer screen, in an augmented reality environment, in a virtual reality environment; in a 2D representation of an environment and/or in a 3D representation of an environment; a simulator platform; an avatar; the occupant; seat actuators; a vehicular system; a functionally selectable element of a graphical-user-interface (GUI); a program function; a menu; an image; a sequence of images; an icon; a widget; a sound; a home appliance; a drawing tool (virtual or tangible) and/or an apparatus suitable to alter an environmental parameter (e.g., degree of pressure, temperature, humidity) and/or any other modality, such as sound emitted by an output device.

A "state" of occupant the support device may for example refer to a configuration, position and/or orientation of the various members, units and/or parts of the support device.

In accordance with the aforesaid, the occupant support device and system may in some embodiments be part of or constitute a simulator system for enabling providing the support device's occupant with a simulator environment of a state or change of a state of a vehicular system, e.g., responsive to an input provided by the occupant and/or provided by any other source (e.g., an automatic or human flight trainer). Non-limiting examples of a vehicular system control that can be simulated by the occupant support device and system can include an automobile; a bus; a boat; an electric or non-electric two-wheeled vehicular system including, for example, a motorcycle and a bicycle; an aircraft including, for instance, a helicopter, airplane, glider aircraft, drone; a hot air balloon; a parachute; a jetpack, a hoverboard; an ejection seat and/or a wingsuit. Additional or alternative simulator environments may relate to exercise equipment simulators, a fitness coach simulator; a fitness club environment; and/or the like.

Within this description, the term "elastically coupled" will be used to indicate that a first element is joined to a second element with a flexible connection that defines and tends to restore a nominal positional relationship between the elements but allows relative motion in at least one direction.

Although embodiments of the occupant support device are described herein with respect to a seating device or seat which is configured to support an occupant in a seated position, this should by no means be construed as limiting. Accordingly, the disclosed embodiments may additionally or alternatively refer to a device which can support its occupant in a partially or fully reclined position such as, for example, a (balancing) stretcher, couch, daybed, chaise, or the like; and/or which to a device which can support its occupant or user in a standing position. Accordingly, embodiments may herein also be disclosed with respect to an "occupant support device" or, simply, "support device".

The midsagittal plane (also called the median plane) is defined (Merriam Webster Medical Dictionary) as a vertical longitudinal plane that divides a bilaterally symmetrical animal, such as a person, into right and left halves. A coronal plane (also called a frontal plane) is defined as a plane parallel to the long axis of a body and at right angles to the midsagittal plane.

Since the elements of the occupant support device disclosed herein are typically symmetrical about the midsagittal plane, the reference designators used in the figures may include the suffixes "L" and "R" to indicate mirror-imaged left-side and right-side elements having the same support function.

According to some embodiments, the occupant support system for controlling an object (e.g., virtual, intangible, tangible, and/or physical object), for example a computer-generated representation of an object, may comprise (i) a support device comprising a plurality of support members configured to support an occupant, and a corresponding plurality of independently movably supported suspension systems such to provide at least one independent motion selected from vertical, lateral, tilt and azimuthal motions, and longitudinal roll motion of the support members; (ii) a plurality of sensors which are operatively coupled with the support members and configured to measure a parameter which is indicative of an input provided by the occupant, while occupying the device, in a hands-free manner and to produce a signal, wherein the input changes a state of the support device; (iii) a memory module comprising computer-executable instructions; and (iv) a processor and/or a controller which is operative to receive the produced signal and determine a state of the occupant support device based on the produced signal and the computer-executable instructions, and to provide instructions for controlling the computer-generated object representation.

It should be noted that the expression "at least one or a plurality of sensors which are operatively coupled with the support members" as well as grammatical variations may also encompass embodiments of system configurations in which at least one or all of the plurality of sensors are directly coupled (e.g., attached) to the occupant (e.g., as wearable sensors).

In the following the present invention is illustrated by way of figures that depict specific embodiments of the present invention and which figures are not intended to limit the scope of the present invention beyond the scope of the appended claims. For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements.

The following description of support, for example seating devices, systems and methods for controlling an object is given with reference to particular examples, with the understanding that such systems and methods are not limited to these examples.

Figure 1:
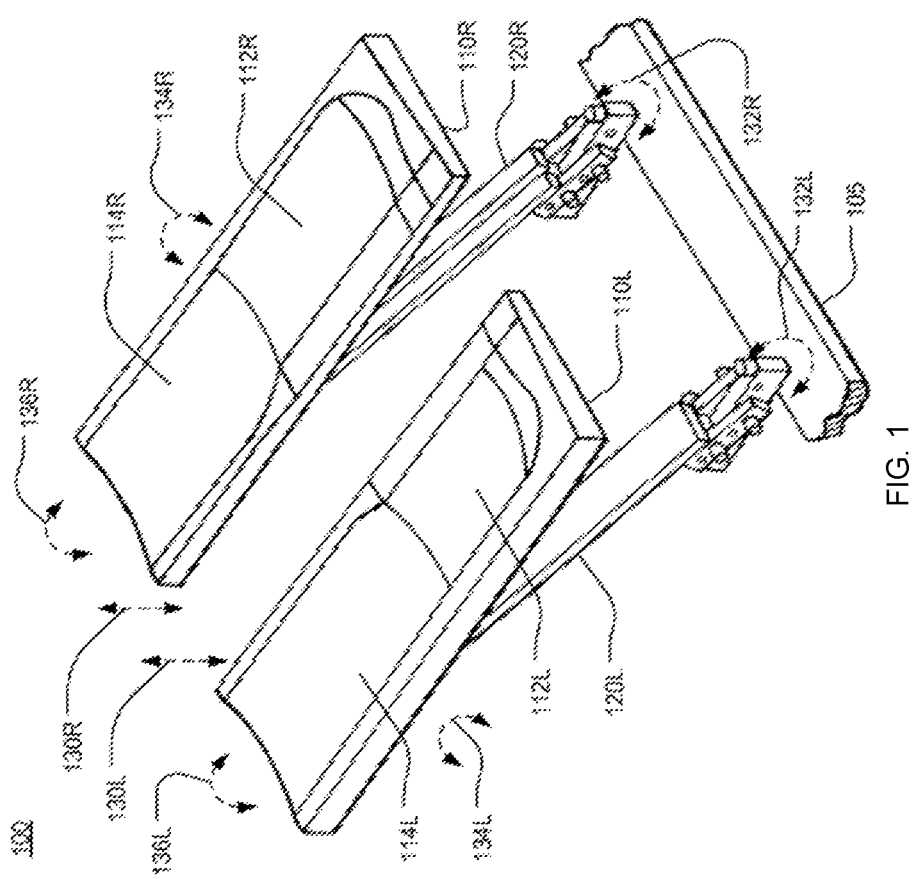
FIG. 1 is a schematic perspective view of a seating device.

Referring now to FIG. 1, support device 100 may include a left seat 110L and a right seat 110R. Each of the left and right seats 110L/R may be independently supported by a corresponding suspension system 120L/R which may be anchored to a common base 105 such as to provide at least one independent motion selected from vertical, lateral, tilt and azimuthal motions, and longitudinal roll motion of the left and right seat support members.

In FIG. 1, base 105 is represented as a single structural member. However, base 105 may include components and elements not shown in FIG. 1. Base 105 may be any known chair base and may include a plurality of legs, casters, a swivel mechanism, and/or other known structures. Base 105 may be removably or permanently coupled to a vehicular device, such as an automobile, bus, boat helicopter and/or airplane. Base 105 may be any apparatus suitable to support device 100.

Optionally, the left and right seats 110L/R may have concave recesses 112L/R to support the buttocks of an occupant. Optionally, the left and right seats 110L/R may have approximately cylindrical recesses 114L/R to support the thighs of the occupant. Optionally, the recesses 112L/R and 114L/R may be shallow or may have sufficient depth to provide some degree of lateral support and restraint for the occupant.

Optionally, support device 100 may allow the left and right seats 110L/R to rotate in elevation about separate axes, as indicated by arrows 134L and 134R. Optionally, the axis for the rotation in elevation of the left and right seats 110L/R may be horizontal. Optionally, the axis for the rotation in elevation of the left and right seats 110L/R may deviate from horizontal due to the longitudinal roll of the left and right seats 110L/R. Optionally, the support device 100 may also allow independent azimuthal rotation of the left and right seats 110L/R about separate axes, as indicated by arrows 132L and 132R. Optionally, the axis for the azimuthal rotation of the left and right seats 110L/R may be approximately vertical. Optionally, the axis for the azimuthal rotation of the left and right seats 110L/R may deviate from vertical if the support device 100 is attached to a vehicle, such as for example an automobile, bus, or boat. Optionally, the axis for the azimuthal rotation of the left and right seats 110L/R may be roughly aligned with an occupant's hip joints.

Figure 2:
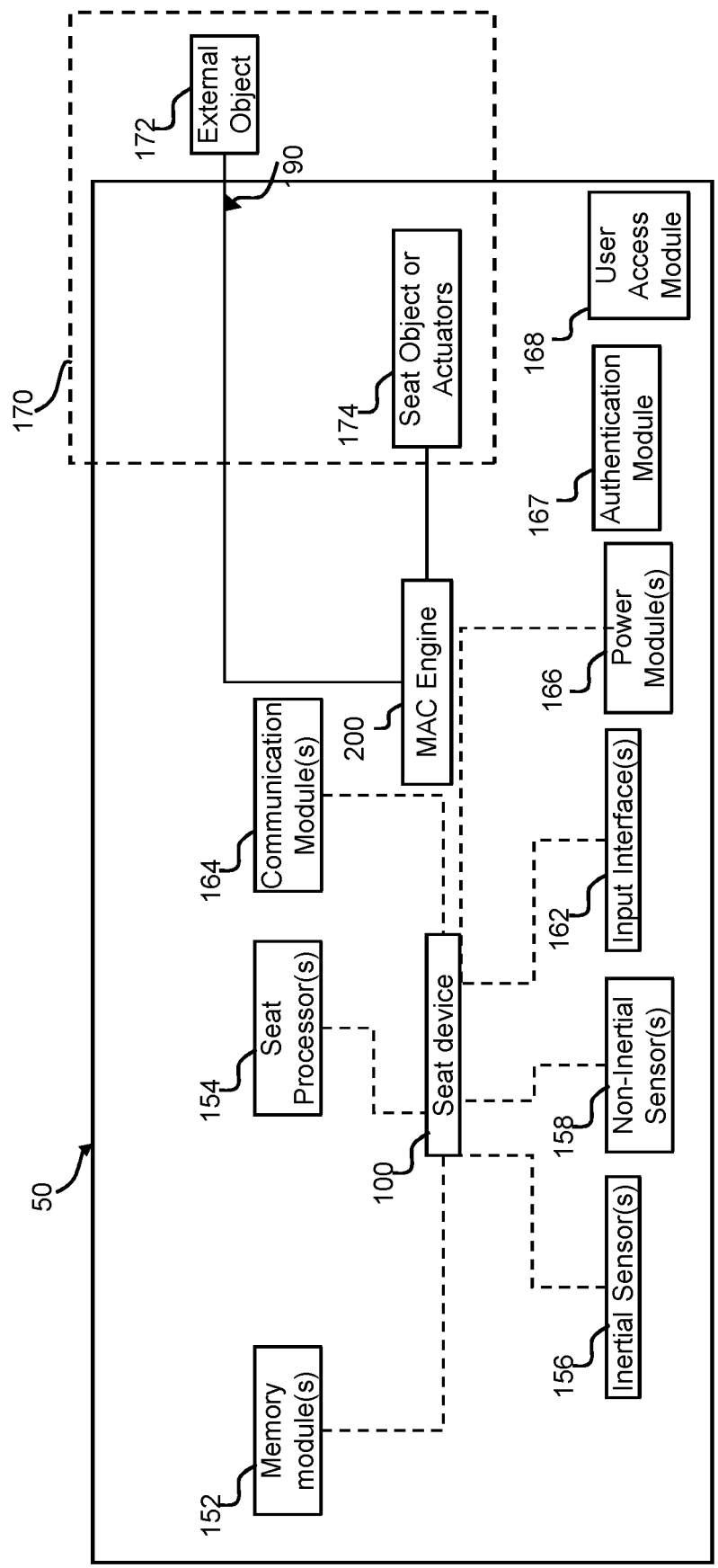
FIG. 2 is a block diagram illustration of a seating system for monitoring and controlling objects, for example computer-generated representations of objects.

Further referring to FIG. 2, a system 50 may include support device 100 and a plurality of additional components and/or modules for implementing a monitoring and/or controller (MAC) engine 200 which may be operative and configured to implement methods, processes and/or operations for monitoring and/or controlling an object 170. Object 170 may include an external object 172 and/or a (internal) seat object 174, e.g., actuators for controlling motion of support device 100. The term "seat object" and "seat actuator" may herein be used interchangeably.

The term "external object" refers to an object, which is not part of support device 100. Conversely, the term "internal object" refers to an object which can be considered part of support device 100. Accordingly, an internal object may include one or more actuators for controlling parts of support device 100. In some embodiments, a first internal seat object may provide an input to another internal seat object, based on which the other internal seat object may provide a control output for controlling a computer-generated representation of an object.

While in FIG. 2 components and/or modules are schematically illustrated as being external to and operably coupled with support device 100, this should by no means be construed limiting. For example, in some embodiments, at least one of the components and/or modules may be comprised in support device 100.

MAC engine 200 may be realized by one or more hardware, software and/or hybrid hardware/software modules, e.g., as outlined herein. A module may be a self-contained hardware and/or software component that interfaces with a larger system (Alan Freedman, The Computer Glossary 268, (8th ed. 1998)). A module may comprise a machine or machine executable instructions. A module may be embodied by a circuit or a controller programmed to cause the system to implement the method, process and/or operation as disclosed herein. For example, a module may be implemented as a hardware circuit comprising, e.g. custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. The configuration of MAC engine 200 as outlined herein should by no means be construed as limiting and is, therefore, for illustrative purposes only.

System 50 may, for example, include one or more memory modules 152, seat processors and/or controllers 154, inertial sensors 156, non-inertial sensors 158, seat actuators 174, input interfaces 162, communication module(s) 164, and one or more power modules 166 for powering the various components of system 50. Optionally, power module(s) 166 may be operably coupled with external object 172 for the powering thereof.

The various components of system 50 may communicate with each other over one or more communication buses (not shown) and/or signal lines (not shown) using wired and/or wireless communication.

Memory module(s) 152 may include transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory module(s) 152, for example, process temporally-based instructions are suitable. As long-term memory, memory module(s) 152 may, for example, include a volatile or non-volatile computer storage medium, a hard disk drive, a solid state drive, a magnetic storage medium, a flash memory and/or other storage facility. A hardware memory facility may, for example, store a fixed information set (e.g. software code) including, but not limited to, a file, program, application, source code, object code, and the like.

The term "processor", as used herein, may additionally or alternatively refer to a controller. A processor such as, for example, seat processor 154 may be implemented by various types of processor devices and/or processor architectures including, for example, embedded processors, communication processors, graphics processing unit (GPU)-accelerated computing, soft-core processors and/or embedded processors.

Inertial sensor(s) 156 may include, for example, one or more accelerometers and/or gyroscopes. Non-inertial sensors 158 may include, for example, one or more barometers; proximity sensors; position sensors (e.g. linear and/or angular displacement sensors); motion sensors; weight sensors; pressure sensors; sensor measuring electrical activity produced by skeleton muscles of the occupant (also called electromyography (EMG) sensors); altimeters; magnetic field sensors; electric field sensors; (EEG) electroencephalography sensors; friction sensors; light sensors; touch screen sensors; receivers; e.g. of a Global Positioning System; an eye-tracker; a head-tracker system; a camera system and/or a sound or microphone sensor system.

Seat actuator(s) 174 may, for example, provide an output for generating (e.g. accelerate) or stopping (e.g., decelerate) linear, rotary or oscillatory motion and may be based, e.g., on hydraulic, pneumatic, electric, thermal, optical, auditory, magnetic and/or mechanical mechanisms initiated, e.g., by the occupant. In another example, seat actuators may act responsive to a signal received, e.g., from external object 172 and/or internal object 174. For example, a movement of the occupant's right thigh may provide an input to the corresponding right seat 210R, which in turn may cause vibration or movement of left seat 210L for engaging the occupant's left thigh.

Input unit interface(s) 162 may include, for example, a keyboard, a keypad, a mouse, a touch-screen, a touch-pad, a track-ball, a stylus, a microphone, a gesture-based input device, and/or other suitable pointing and/or input device.

Communication module 164 may, for example, include I/O device drivers (not shown) and network interface drivers (not shown) for enabling the transmission and/or reception of data over network 190. A device driver may, for example, interface with a keypad or a USB port. A network interface driver may, for example, execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), light fidelity data transfer (Li-Fi), extranet, 2G, 3G, 3.5G, 4G including, for example, Mobile WIMAX or Long Term Evolution (LTE), advanced, Bluetooth® (e.g., Bluetooth smart), ZigBee™, near-field communication (NFC) and/or any other current or future communication network, standard and/or system.

Power module 166 may include an internal power supply of system 50, e.g., a battery and/or an external power supply like, for example, power cord or cable for transmitting, e.g., grid power.

Memory module 152 may include instructions which, when executed, e.g. by processor 154, may cause the execution of the method, process and/or operation for monitoring and/or controlling object 170. Such method, process and/or operation may herein be implemented by MAC engine 200. According to some embodiments, some implementations and/or portions and/or processes and/or elements and/or functions of MAC engine 200 may be implemented by system 50 and some may be implemented by object 170.

According to some embodiments, inertial sensors 156 and/or non-inertial sensors 158 may be operative and configured to measure a parameter which can be indicative of an input generated by the occupant and produce a signal which can be received by processor 154. Based on the received signal, seat processor 154 may determine a state (which can also refer or include a change in a state) of support device 100.

The term "state" as used herein may, for example, refer to a change in the position of support device 100 relative to world coordinates and/or to a change in the position of an element of the seating device relative to another element of the device.

Data descriptive of a determined state or a change in state of support device 100 may be recorded by, e.g., in memory module 152. Optionally, based on a determined state or a change in a determined state of support device 100, instructions may be provided by processor 154 for controlling external object 172 and/or for controlling seat actuators 158. Optionally, a signal may be generated at object 170 and received from object 170 by seating at support device 100 based (e.g., responsive) on a determined state or a change in a state of support device 100. For example, external object 172 may provide a feedback to actuators 174 of support device 100 responsive to a signal generated by processor 154. Optionally, seat processor 154 may receive a signal from object 170 at processor 154 which may generate, based on instructions encoded in the signal, another signal for controlling external object 172 and/or (internal) seat object 174 such as, for example, an actuator of support device 100.

According to some embodiments, an object may include a plurality of objects 170 that are independently controllable by support device 100.

According to some embodiments, the expression "controlling an object" as well as grammatical variations thereof may include, responsive to detecting a state of support device 100, generating, modifying and/or repositioning the object and/or modifying, adding to and/or removing an attribute of the object.

For example, controlling an object may include selecting, enlarging, zooming in, diminishing, zooming-out, rotating, and/or changing a position of the object in a virtual 2D or 3D environment. For example, zooming-out may be accomplished by the occupant through attaining a backwards leaning position, leaning sideways to the left, by increasing the angle between left and right seats 110L/R, by contracting skeleton muscle and/or by making rocking movement. Conversely, zooming-in may for example be achieved by attaining a forward leaning position, leaning sideways to the right, by decreasing an angle between the left and right seats 110L/R and/or by relaxing skeleton muscle.

Optionally, system 50 may enable the occupant to traverse through and hands-free explore a virtual and/or augmented reality environment. Such environments may be presented to the occupant, for example, via a virtual or augmented reality system such as a helmet worn by the occupant. The virtual or augmented reality system may receive inputs from support device 100 enabling the occupant to hands-free traverse the environment allowing the occupant to use his hands or other pointers to interact with objects displayed in the virtual or augmented reality environment. Optionally, the point of view (POV) in the virtual and/or augmented reality environment may be that of the occupant himself or that of an avatar. The occupant may use his hands to virtually pick and hold in his hands objects of the presented structure without impairing his traversing movability in the presented virtual or augmented reality environment.

Optionally, controlling object 170 may include changing an attribute of the (virtual) object including, for example, associated material properties, data encoding type, file type, animation characteristics, 3D viewing effects, mobility, color, sound, fill patterns, motion patterns, a motion degree of freedom and/or weight. Optionally, controlling an object may relate to program functions including, for example, scrolling, selecting a checkbox, selecting an editing function ("cut", "copy", "paste", " " etc.). Optionally, controlling an object may include selecting or generating a logic condition (e.g., logical "IF", "WHILE", "AND", "NAND", "OR", "XOR"), a data structure (e.g., a pointer) and/or a mathematical operator.

According to some embodiments, controlling object 170 can have a variety of applications. For instance, support device 100 may be employed in medical robotics applications for controlling a virtual medical professional. Responsive to controlling the virtual medical professional, real-world tools may be controlled. Optionally, support device 100 may enable hands-free traversing through a virtual reality 3D image representation of structures inside a mammalian body (e.g., human body) allowing the occupant to explore the structures. The occupant may use his hands to virtually pick and hold in his hands objects of the presented structure without impairing his movability in the presented virtual reality environment.

According to some embodiments, system 50 may be operative and configured to enable its occupant to selectively alter functional allocations of his movements, e.g., based on detected key input and/or responsive to detecting eye-tracking based inputs.

For example, responsive to detecting a given keypad input selection, system 50 may enable support device 100 to have "mouse" function capabilities. Conversely, if no key input selection is detected, these "mouse" functions are disabled. In another example, an eye tracking system may be employed for selectively altering functional movement allocations.

According to some embodiments, support device 100 may include sensors, which are operative to detect physical stimuli which are not necessarily directly related to a change in the state (e.g., position) of the seating device. For example, support device 100 may comprise sensors for measuring values relating to environmental parameters and/or vital signs parameters of the occupant. In some embodiments, support device 100 may receive values relating to parameters, which are measured by external sensors that are not part of support device 100. Such external sensors may, for example, be included in devices worn or carried by the occupant, e.g., in a wearable device, a suit, and/or in an implant of the occupant. In some embodiments, the external sensors may include a camera.

According to some embodiments, support device 100 may be covered by cushioning material, or, in other words, in a seating cushion.

As already outlined herein above, the disclosed embodiments may also be implemented with support devices other than the seating device disclosed herein. The disclosed embodiments may, for example, also be employed in association with a balancing stretcher device (not shown).

The plurality of support members may, for example, respectively and individually support at least one or more body parts selected from legs, arms, hands, fingers, the head, and the back of its occupant. In an embodiment, support members may respectively and individually support thighs and lower legs of its occupant. Each support member may, for example, be movable by the respective body part which it supports and provide a controlling output responsive to such movement. Other example support devices are disclosed in WO2012/010282 titled "Seat Device for Supporting a Sitting Person" and in WO 2013131753 titled "Balance Bed", in particular in the claims, for example, claim 1 of each document, both of which documents are incorporated herein by reference in their entirety. The balance bed may for example be employed for providing its occupant with a wingsuit flying simulation experience. The occupant lying on the balance bed may be presented with an augmented or virtual reality environment displaying to the occupant a scenery which changes responsive to input provided by the occupant via actuators of the balance bed and in correspondence with an actual wingsuit flying experience.

System 50 also provides for a software application developer platform.

In an embodiment, system 50 may provide its occupant with personalized advertising, e.g., based on one or more inputs provided by the occupant to system 50. For example, an occupant that has selected a "bicycle riding" simulator may be provided with advertising information (e.g., via auditory and/or visual display) about bicycle equipment and/or special nutrition. In an embodiment, system 50 may be operative and configured to assess a level of proficiency (e.g., including dexterity) of the occupant for mastering a certain activity, e.g., based on inputs provided by the occupant via the system's 50 sensors. Advertisement that can be displayed to the occupant may be personalized according to the assessed level of proficiency.

In an embodiment, system 50 may operative and configured to allow for Internet of Things (IoT) applications. For instance, system 50 may be operative and configured to sense values relating to physical parameters (e.g., vital signs parameters) and/or emotional parameters (e.g., through the measurement of EEG values) of the occupant, determine a certain state of the occupant, and provide, based on the determined state an output to other equipment (not shown) that is operable coupled with system 50. For example, system 50 may be communicably coupled with a beverage dispenser machine (e.g., coffee machine) and automatically prepare coffee to the occupant if it receives a corresponding input from system 50, e.g., indicative of a state that the occupant has become tired. In an embodiment, beverages may have to be paid for by the occupant. In an embodiment, the monetary value for purchasing beverage may be personalized based on the determined state of the occupant. For example, responsive to determining that the occupant is tired, system 50 may calculate and display the occupant a discount on beverage (e.g., coffee) and/or any other item and/or display the occupant rhythmic or pounding music.

In an embodiment, data relating to physical and/or emotional parameters of an occupant may be collected (e.g., continuously) via the sensors and provided to the occupant and/or a third party. The data may optionally be analyzed. For example, based on a measured value relating to monitored physical and/or emotional parameters (e.g., including cognitive activity), system 50 may determine a state of the occupant and, depending on the determined state, associate the occupant with information which is descriptive of the determined state. Such information may be provided to the occupant and/or to a third party. For example, information descriptive of the occupant's current temper may be provided to the occupant's co-workers. Optionally, the occupant may be assigned with tasks which substantially match or suit the occupant's physical and/or emotional state, e.g., as determined by system 50. Optionally, the occupant's attention may be drawn to a task of a "to-do-list" (i.e., displayed to the occupant) when the system determines that the occupant is in an emotional and physical state suitable for accomplishing the task. Optionally, system 50 may determine a state of cognitive activity of the occupant. Based on a determined state of the occupant, information to third parties may be provided indicative of the occupant's cognitive activity, mental and/or physical state. Such information may comprise, e.g., "please do not disturb", "concentrating", and/or the like.

In an embodiment, system 50 may be configured to record a state and/or a change of state of the occupant for identification and/or authentication purposes and comprise, for instance, an authentication module 167 for determining eligibility of occupants to use system 50. Optionally, system 50 may further include a user access module 168. If eligibility of the occupant to use system 50 is verified (i.e., the occupant becomes an authorized occupant), an access control phase may in some embodiments be invoked by access module 168 for determining and, optionally, controlling, which functionalities of system 50 the authorized occupant can use and which not.

System 50 may for example record values relating to parameters of statics and/or dynamics (e.g., kinetics) of support device 100 that is operably engaged by an occupant, and/or statics and/or dynamics of the occupant himself. Such parameters may include, for example, occupant latencies and/or response times. Additionally or alternatively, such parameters may for example include weight, load, force and/or pressure applied by the occupant on support device 100. Based on the values recorded over time, at least one pattern associated with the occupant(s) may be identified by MAC engine 200 by employing pattern recognition. For example, one or more first movement, force application, load distribution and/or weight shifting patterns may be associated with a first occupant and one or more second movement, load distribution, force application and/or weight shifting patterns, which may be different from the one or more first patterns, may be associated with a second occupant of support device 100 by MAC engine 200. Based on the different patterns, system 50 may associate a current use of support device 100 to a certain occupant.

For example, system 50 may be configured to record, at a first instance in time, a load, force, weight and/or pressure distribution of an occupant at one or more states of seating device 100 along with respective time stamps of recordation. The recorded load, force, weight and/or pressure distribution(s) may be compared, against values of load, force, weight and/or pressure distribution(s) that are recorded at another instance in time e.g., by MAC engine 200, at recurring identical or substantially identical states of support device 100. In other words, posture patterns may be compared with each other. Based on the performed comparison, MAC engine 200 may determine whether the load and/or force distributions recorded at different instances in time relate to the same occupant or not. System 50 may thus be operative (also: configured) to associate the use of support device 100 to different occupants. For example, MAC engine 200 may detect and provide an output indicating if uses of support device 100 are made by the same occupant or not. A termination of a use of support device 100 may for example be indicated if the occupant alights from support device 100 and/or if any other input and/or action is performed indicating termination of the use of support device 100.

Generally, based on one or more patterns associated with an occupant, system 50 may be operative to identify the occupant, e.g., using an individual "involuntary signature" or "fingerprint" such as a load distribution and/or motion "fingerprint" to which support device 100 is imparted by the occupant. The expression "involuntary signature" or "involuntary fingerprint" as used herein may refer to statics and/or dynamics of a pattern identified by system 50 when the occupant engages with support device 100. Such pattern(s) are not necessarily performed by the occupant specifically and consciously for the declared purpose of biometric identification. However, such pattern(s) are still utilized by system 50 for biometric identification and authentication. For example, a user may operably engage with support device 100 (e.g., sit or lie on support device 100) to become its occupant. Responsive to detecting the operable engagement of the user with support device 100, MAC engine 200 may analyze the load distribution the occupant subjects onto support device 100. If the load distribution matches a biometric authentication criterion stored in memory module 152, system 50 may be unlocked for use by the occupant. Otherwise, system 50 may remain locked for use by the same occupant.

In an embodiment voluntary signatures may be used for occupant identification. For instance, the occupant may be required to consciously perform a particular sequence of movements (e.g., hip movement) for biometric identification and authentication. Clearly, such physical or occupant-body statics and/or dynamics-based biometric authentication may be combined with additional authentication techniques (e.g., password, retina, fingerprint, etc.). Accordingly, in some embodiments, additional single-factor or multi-factor authentications may be required by authentication module 167 for authentication.

In some embodiments, system 50 may collect data descriptive of statics and/or dynamics subjected by an occupant over a period of time to support device 100, e.g., to adapt the authentication criterion respective of the said occupant. In some embodiments, the authenticity of an identity of an occupant may be vetted repeatedly (e.g., periodically) by MAC engine 200 for authentication purposes. For instance, the statics and/or dynamics of an occupant of support device 100 may be monitored continuously and compared against an authentication criterion.

In some embodiments, values relating to the statics and/or dynamics of support device 100 and the associated occupant may be collected over time for adapting an authentication criterion.

In some embodiments, values relating to parameters of occupant posture and/or movements (including for instance weight shifting and/or applied force) may be analyzed by MAC engine 200 employing pattern recognition techniques, e.g., for monitoring and/or detecting one or more physical, cognitive and/or mental states of interest of the interest. Such physical, cognitive and/or mental states of interest may relate to the occupants' motor functions including for instance motoric development such as motoric functions including, for example, motor disorders, vestibular disorders, coordination disorders, and/or visual disorders. In some embodiments, the occupant may receive instructions to execute, for example, a sequence of movements. Such instructions may be provided by a medical professional and/or by a computerized module of MAC engine 200. Additionally or alternatively, actuators 174 of support device 100 may cause support device 100 to change its configuration. MAC engine 200 may analyze the occupant's response to the received instructions and/or the occupant's response to a change in the configuration of support device 100 and provide, based on the said response, an output relating to an assessment of the occupant's motoric functions and/or visual capabilities. MAC engine 200 may for example identify signs of or precursors of motoric disorders. In some embodiments, system 50 may be operative to improve balance and/or human body dynamism of the occupant of support device 100, for example, by subjecting the occupant, e.g., by the support device 100, to different postures or movements for exercising purposes.

Figure 3:
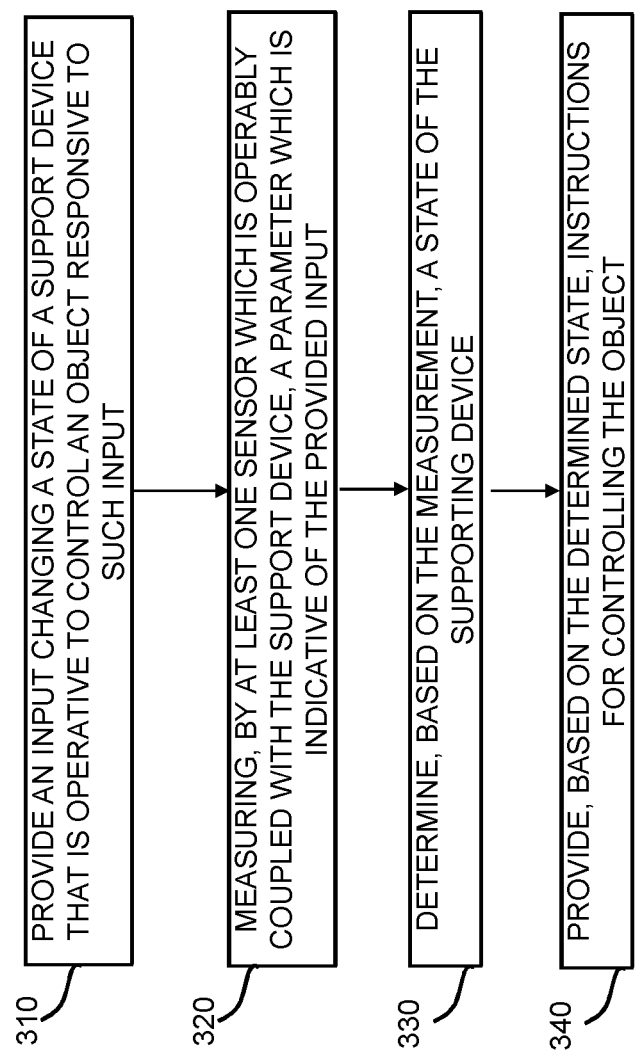
FIG. 3 is a flow chart illustration of a method for controlling an object, for example a computer-generated representation of objects by the system.

Additional reference is made to FIG. 3, which is a flow chart illustration of a method for controlling an object 170 by system 50.

As indicated by block 310, the method may include, in some embodiments, providing an input changing a state of a support device 100 (e.g., a seating device) that is operative to control an object, responsive to such input.

As indicated by block 320, the method may further include, in some embodiments, measuring, by at least one sensor which is operably coupled with the support device, a parameter which is indicative of the provided input.

As indicated by block 330, the method may include, in some embodiments, determining, based on the measurement, a state of the support device.

As indicated by block 340, the method may additionally include in some embodiments, providing, based on the determined state, instructions for controlling the object (which may, for example, be a computer-generated object representation).

The various features and steps discussed above, as well as other known equivalents for each such feature or step, can be mixed and matched by one of ordinary skill in this art to perform methods in accordance with the principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well-known to those skilled in the art and, thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The terms "non-transitory computer-readable storage device" and "non-transitory machine-readable storage device" encompass distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is noted that the expressions "concurrently" and "in real-time" as used herein may also encompass the meaning of the expression "substantially concurrently" and "substantially in real-time".

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Positional terms such as "upper", "lower" "right", "left", "bottom", "below", "lowered", "low", "top", "above", "elevated", "high", "vertical" and "horizontal" as well as grammatical variations thereof as may be used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

"Coupled with" means indirectly or directly "coupled with".

Discussions herein utilizing terms such as, for example, "processing", "computing", "calculating", "determining", "establishing", "analyzing", "checking", "estimating", "deriving", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may also refer to "heuristically determining".

It should be understood that where the claims or specification refer to "a" or "an" element, such reference is not to be construed as there being only one of that element.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made.

It is noted that the term "perspective view", as used herein, may also refer to an "isometric view".

The term "non-transitory" is used to exclude transitory, propagating signals, but to otherwise include any volatile or non-volatile computer memory technology suitable to the application.

The term "operatively coupled" may encompass the meanings of the terms "responsively coupled", "communicably coupled", and the like.

Unless otherwise indicated, the word "or" in the description and claims is considered to be the inclusive "or" rather than the exclusive or, and indicates at least one of, or any combination of items it conjoins.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

While the technique has been described with respect to a limited number of embodiments, these should not be construed as limitations on the scope of the invention, but rather as exemplifications of some of the embodiments.

The invention claimed is:

1. An occupant support system for controlling an object, the system comprising:
   (i) a support device configured to support a user when the user is an occupant in a seated position, the support device comprising:
      a plurality of support members configured to support the occupant; and
      a corresponding plurality of independently movably supported suspension systems, wherein each movably supported suspension systems provide at least one independent motion selected from vertical, lateral, tilt and azimuthal motions and longitudinal roll motion of the support members;
   (ii) a plurality of sensors which are operatively coupled with the support members and configured to measure a parameter which is indicative of a force applied by the occupant onto the support members, while occupying the support device, in a hands-free manner, wherein the applied force imparts motion of the support members and the motion of the support members produces a signal;
   (iii) a memory module comprising computer-executable instructions; and
   (iv) a processor operative to receive the produced signal and to perform, based on the produced signal and the computer-executable instructions:
      recording a load pattern imparted by the user on the support device, the load pattern resulting from involuntary movements of the user as the user operably engages the support device to become the occupant thereby generating an involuntary signature; and
      based on the involuntary signature, comparing the load pattern to a load pattern recorded at another instance at reoccurring identical or substantially identical states of the support device to identify the identity of the occupant, authenticate the identity of the occupant, or both.

2. The occupant support system of claim 1, wherein the object is a computer-generated representation of an object.

3. The occupant support system of claim 1, wherein the plurality of support members comprises a left seat and a right seat of a seating device configured to support the occupant in a seating position; and a corresponding left suspension system and a right suspension system which are anchored to a common base, wherein each of the left and right seats are independently supported by the corresponding suspension system to provide the at least one independent motion selected from vertical, lateral, tilt and azimuthal motions and longitudinal roll motion of the left and right seats.

4. The support system according to claim 3, further comprising at least one supporting member for respectively and individually supporting at least one of the following body parts selected from arms, lower legs, hands, feet, fingers, the head and the back of the occupant.

5. The occupant support system according to claim 1, further comprising a monitoring and/or controller (MAC) engine which is operative and configured to monitor and/or control the object.

6. The occupant support system according to claim 5, wherein the MAC engine is operative and configured to:
 (a) measure, by at least one sensor which is operably coupled with the support device, a parameter which is indicative of an input provided by the occupant;
 (b) determine, based on the measurement, a state of the support device; and
 (c) provide, based on the determined state, instructions for controlling the computer generated object representation.

7. The occupant support system according to claim 5, wherein the MAC engine is operative and configured to enable the occupant of the support device to selectively alter functional allocations of his movements.

8. The occupant support system according to claim 5, wherein the MAC engine is operative and configured to receive a feedback signal from an external object responsive to an input provided by the occupant, wherein the feedback signal controls the MAC controller of the occupant support system.

9. The occupant support system according to claim 1, wherein the processor is configured to provide an instruction to the occupant to execute a sequence of movements that cause a change in a configuration of the support device, analyze a response of the occupant to the instruction, and evaluate motoric functions of the occupant to identify a sign or precursor of a motoric disorder.

10. The occupant support system according to claim 9, further comprising a user access module controlling which functionalities of the system an authorized occupant can use and cannot use.

11. A method for controlling an object by providing an input via a support device configured to support an occupant in a seated position, the method comprising:
 (i) receiving, from an occupant being seated in the support device, a force which causes motion of one or more support members of a support device that is operative to control an object responsive to such force;
 (ii) measuring, by at least one sensor which is operably coupled with the support device, a parameter which is indicative of the motion of the one or more support members;
 (iii) recording a load pattern imparted by the user on the support device, the load pattern resulting from involuntary movements of the user as the user operably engages the support device to become the occupant thereby generating an involuntary signature; and
 (iv) based on the involuntary signature, comparing the load pattern to a load pattern recorded at another instance at reoccurring identical or substantially identical states of the support device to identify the identity of the occupant, authenticate the identity of the occupant, or both.

12. The method of claim 11, wherein the object includes a computer generated representation of the object.

13. The method of claim 11, further comprising the step of selectively altering functional allocations of the support device's movements.

14. A computer program product comprising a non-transitory computer readable storage medium having program instructions embodied therein for the execution of the method steps according to claim 11.

\* \* \* \* \*